United States Patent [19]
Ignatuk et al.

[11] Patent Number: 5,195,707
[45] Date of Patent: Mar. 23, 1993

[54] OPTIC POSITIONING DEVICE

[76] Inventors: Wayne R. Ignatuk, P.O. Box 98, Crystal Beach, Fla. 34681; David A. Steffey, 12701 Chocktaw Trail, Hudson, Fla. 34669

[21] Appl. No.: 882,061

[22] Filed: May 12, 1992

[51] Int. Cl.$^5$ ............................................. F16M 11/12
[52] U.S. Cl. ..................................... 248/179; 359/876
[58] Field of Search ............... 248/179, 181, 183, 178, 248/288.5, 371; 359/873, 874, 876, 822, 811; 403/61, 90

[56] References Cited

U.S. PATENT DOCUMENTS

| | | | |
|---|---|---|---|
| 1,295,524 | 2/1919 | Kirby | 248/179 X |
| 1,319,393 | 10/1919 | Hollis . | |
| 2,898,068 | 3/1959 | Warren . | |
| 2,922,609 | 1/1960 | Collier | 248/179 |
| 3,187,628 | 6/1965 | Canns | 359/876 X |
| 3,588,025 | 6/1971 | Gersman . | |
| 4,019,710 | 4/1977 | O'Connor et al. . | |
| 4,043,686 | 8/1977 | Hackett . | |
| 4,068,961 | 1/1978 | Ebner et al. . | |
| 4,157,876 | 4/1979 | DiGiulio . | |
| 4,863,243 | 9/1989 | Wakefield | 359/876 X |
| 4,883,347 | 11/1989 | Fritzel | 359/876 X |
| 4,989,965 | 2/1991 | Bryan | 359/871 X |
| 5,058,842 | 10/1991 | Zemlin | 248/178 |

FOREIGN PATENT DOCUMENTS 2569637  3/1986  France ..................... 359/874

*Primary Examiner*—J. Franklin Foss
*Attorney, Agent, or Firm*—Blodgett & Blodgett

[57] ABSTRACT

An optic positioning device for holding an optical element which has a center and for adjustng the optical element relative to its center. The optic positioning device includes a supporting base which has an upwardly facing concave spherical surface and a holding body for supporting the optical element. The holding body has a downwardly facing spherical surface which is slidably mounted on the concave spherical surface of the supporting base. The radial centers of the concave and convex spherical surfaces are at the center of the optical element.

12 Claims, 1 Drawing Sheet

OPTIC POSITIONING DEVICE

BACKGROUND OF THE INVENTION

This invention relates generally to a mounting and positioning device for an optical element such as a lens, mirror or wave plate which has an optical center. The invention relates particularly to a positioning device for an optical element which has a center that must be maintained on the longitudinal axis of a beam of electromagnetic radiation such as a laser beam while allowing the orientation of the lens as a whole to be adjusted relative to the beam.

Many types of adjustable optical positioning devices have been developed, most of which have a limited range of adjustment positions. In some cases, the fixture which supports the optical element can only be moved within certain planes. Other mounting and positioning devices employ ball and socket connections for providing limited universal movement of the holding element which holds the optical element. However, none of the prior art optical mounting and positioning devices provide for universal adjustment of the optical element while maintaining the optical center of the optical element at the same position and space. The optical element is used in conjunction with other devices in an optical system such as a device for transmitting a beam of radiation and a device for receiving the beam of radiation. The positioning of the optical element relative to other devices in the system is critical. If the orientation of the optical element relative to the other devices in the system is changed or adjusted, means must be provided for keeping the center of the optical element on the axis of the beam of radiation or means must be provided for adjusting the beam transmitting and receiving devices. These and other difficulties experienced with the prior art optical mounting devices have been obviated by the present invention.

It is, therefore, a principle object of the present invention to provide an optical positioning device which provides universal positioning of an optical element relative to a beam of electromagnetic radiation while maintaining the center of the optical element in a fixed position in space.

Another object of the invention is the provision of an optical positioning device which utilizes a universal ball and socket connection wherein each adjusting movement of the optical holding element is a rotary movement about the center of the optical element.

A further object of the invention is the provision of an optic positioning device which enables the optical element to be easily repositioned while maintaining the center of the optical element at a fixed point and to rigidly secure the optical element once it has been positioned.

It is another object of the this invention to provide an optical positioning device in which the optical element can be rotated completely about a vertical axis which extends through the center of the optical element and which optical element can be pivoted about said center in any vertical plane, regardless of the position of the optical element relative to the vertical axis.

It is a still further object of the invention to provide an optical positioning device which is simple in construction, which is inexpensive to manufacture and easy to use.

With these and other objects in view, as will be apparent to those skilled in the art, the invention resides in the combination of parts set forth in the specification and covered by the claims appended hereto.

SUMMARY OF THE INVENTION

In general, the invention consists of an optic positioning device for holding an optical element which as a center and for adjusting the optical element relative to the central longitudinal axis of a beam of electromagnetic radiation. The optic positioning device includes a supporting base which has an upwardly facing concave spherical surface and a holding body for supporting the optical element. The holding body has a convex downwardly facing spherical surface which is slidably mounted on the concave spherical surface of the supporting base. The radial centers of the concave and convex surfaces are at the center of the optical element when it is supported on the holding body. Clamping means are provided for selectively locking the holding body in a selected angular position relative to the supporting base.

BRIEF DESCRIPTION OF THE DRAWINGS

The character of the invention, however, may be best understood by reference to one of its structural forms as illustrated by the accompanying drawings, in which.

DESCRIPTION OF THE PREFERRED EMBODIMENT

Figure 1:
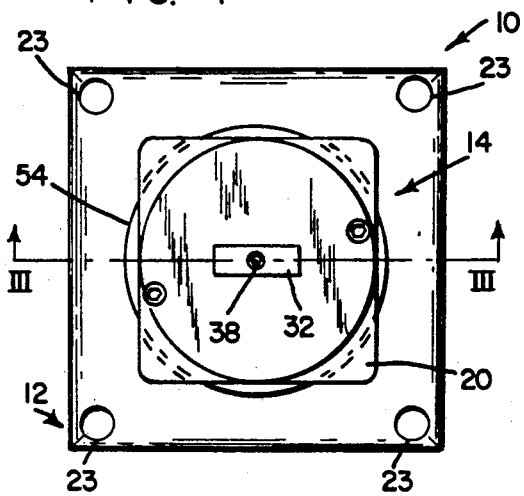
FIG. 1 is a plan view of an optic positioning device embodying the principles of the present invention.
Figure 2:
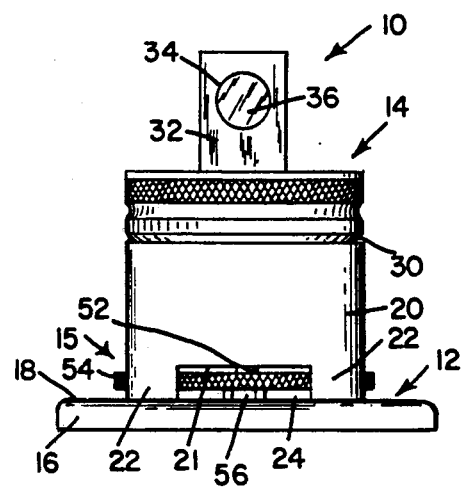
FIG. 2 is a front elevational view of the positioning device.

Referring to the drawings, the optic positioning device of the present invention is generally indicated by the reference numeral 10 and comprises a supporting base which is generally indicated by the reference numeral 12, a holding body for the optical element which is generally indicated by the reference number 14 and clamping means, generally indicated by the reference numeral 15.

The supporting base 12 comprises a flat mounting plate 16 which has an upper flat surface 18 and a main body portion 20 which has a bottom surface 21. The bottom surface 21 is spaced from the surface 18. A plurality of downwardly extending legs 22 extend from the bottom surface 21 to the surface 18 for supporting the main body portion 20 on the mounting plate 16. The space between the surfaces 21 and 18 and between the legs 22 forms an access opening 24 for a purpose to be described. The mounting plate 16 is fixed to the bottom of the legs 22 by fastening means, not shown. The mounting plate has mounting holes 23 which enables the plate to be fastened to a fixed structure. The main body portion 20 has an upper flat surface 25 which has a central depression which is defined by an upwardly facing concave spherical surface 26. A threaded bore 28 extends from the surface 26 to the bottom surface 21.

The holding body 14 has a downwardly facing convex surface 30 which rests on the concave surface 26 and an upwardly extending flange 32. The flange 32 has a horizontal aperture 34 for receiving an optical element such as a lens 36. The lens 36 is removably mounted within the aperture 34 and is locked in place by means of a set screw 38. The convex spherical surface 30 is slidably mounted on the concave surface 26. The radial center of the surfaces 26 and 30 is at the center of the lens 36, or any other optical element which is placed within the aperture 34. The holding body 14 has a cavity 40. The lower portion of the cavity 40 is defined by an upwardly facing concave surface 42. An aperture 44 extends from the surface 42 to the convex surface 30.

The clamping means 15 comprises a bolt 47 and a disc-shaped actuator 54. The bolt 47 has a head portion 48 which is located within the cavity 46 and a threaded shank portion 52 which is threaded into the bore 28 and which extends below the bottom surface 21. The head portion 48 has a downwardly facing convex surface 50 which rests on the upwardly facing concave surface 42 and is slidable on the surface 42. The surface 50 is a spherically curved surface which has a radial center at the center of the lens 36. The actuator 54 is threaded on the lower end of the shank portion 52 and is locked in a fixed position relative to the shank portion 52 by a lock nut 56. The clamping actuator 54 is located within the access opening 24 so that it can be engaged by the fingers of a technician or an operator of the device. When the clamping actuator 54 is rotated about the vertical axis of the bore 52 in one direction, the bolt 47 is moved upwardly out of engagement with the surface 42 so that the holding body 14 is free to move relative to the main body portion 20. When the clamping actuator 54 is rotated in the opposite direction, the bolt 47 is moved downwardly so that the surface 50 engages the surface 42 and clamps the holding body 14 against the body 20 in a fixed position.

Figure 3:
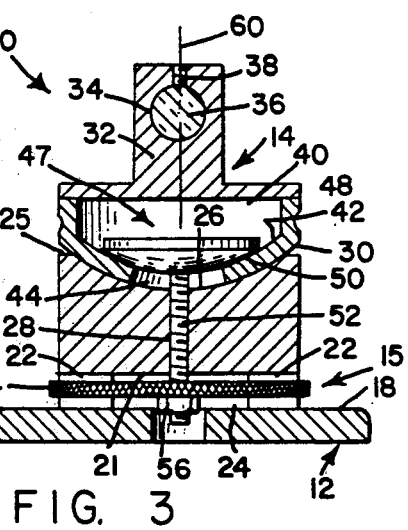
FIG. 3 is a vertical cross-sectional view of the positioning device taken along the line III—III of FIG. 1.
Figure 4:
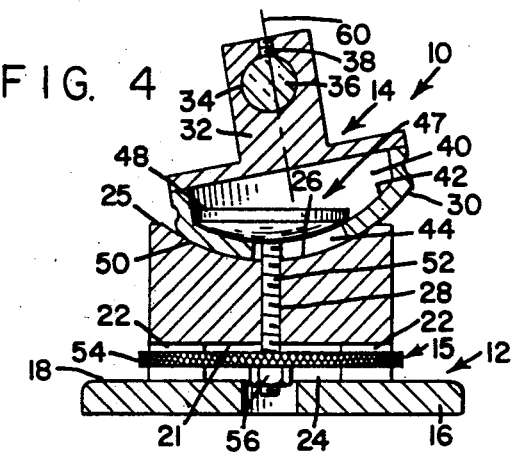
FIG. 4 is a vertical cross-sectional view which is similar to FIG. 3 showing the optical element in an adjusted position.
Figure 5:
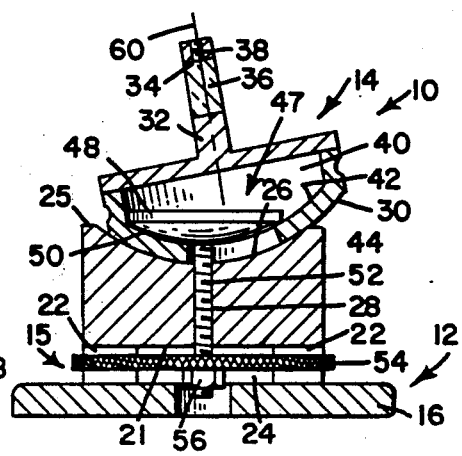
FIG. 5 is a vertical cross-sectional view taken in a vertical plane which is transverse to the plane of line III—III of FIG. 1 and showing the optical element in an adjusted position within the vertical plane of FIG. 5.

The central longitudinal axis of the bore 28 extends through the center of the lens 36 and has a central vertical axis in the example shown in the drawings, it being understood that the optical mounting device 10 can assume any desired orientation, depending on the particular application of the mounting device. The holding body 14 has a central longitudinal axis 60 which extends through the center of the lens 36 and is coaxial with the axis of the bore 28 when the holding body 14 is in a centered position as shown in FIG. 3. The holding body 14 can be rotated completely about the vertical axis of the bore 28 for changing the orientation of the lens 36 relative to a horizontal axis which extends through the center of the lens. However, the center of the lens will remain in the same point in space and will, therefore, remain on the same horizontal axis. The holding body 14 can also be pivoted about the center of the lens 36 in any vertical plane, as shown for example in FIG. 4, wherein the central longitudinal axis 60 of the holding body 14 is at an angle with respect to the central axis of the bore 28. FIG. 5 shows the holding body pivoted within a vertical plane which is transverse to the vertical plane of FIG. 4.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described what is claimed as new and desired to secure by Letters Patent is:

1. An optic positioning device for holding an optical element which has a center and for moving said optical element relative to the central longitudinal axis of a beam of electromagnetic radiation, said optical positioning device comprising:
    (a) a supporting base which has a concave spherical surface, said spherical surface having a radial center at the center of said optical element, said supporting base having an access opening which is spaced from said concave surface and a threaded bore which extends from said concave surface to said access opening,
    (b) a holding body for supporting said optical element, said holding body having a convex-spherical surface which has a radial center of the center of said optical element, said convex surface being slidably mounted on said concave spherical surface for universal positioning on said concave surface, said holding body having a concave spherical clamping surface which is spaced from said convex surface and an aperture which extends from said clamping surface to said convex surface, said clamping surface having a radial center at the center of said optical element, and
    (c) clamping means for selectively locking said holding body in a selected position relative to said supporting base, said clamping means comprising:
        (i) a bolt which has a head portion and a threaded shank portion which extends form said head to said access opening and is threaded into said bore, said shank portion having a central longitudinal axis, said head portion having a convex surface for engaging said concave clamping surface, said convex surface having a radial center at the center of said optical element, and
        (ii) a clamping actuator which is located at said access opening and which is fixed to said shank portion for rotating said shank portion about its central longitudinal axis and causing said head portion to move toward said clamping surface when said shank portion is rotated in one direction and away from said clamping surface when said shank portion is rotated in the opposite direction from said one direction.

2. An optic positioning device as recited in claim 1, wherein said clamping surface is a concave spherical surface which has a radial center at the center of said optical elements and wherein the head portion of said bolt has a convex surface which engages said clamping surface, the convex surface of said head portion having a radial center at the center of said optical element.

3. An optic positioning device as recited in claim 2, wherein said holding body has an internal chamber which contains the head portion of said bolt and said clamping surface.

4. An optic positioning device as recited in claim 2, wherein said supporting base comprises:
    (a) a mounting plate which has flat supporting surface,
    (b) a main body portion which has an opposite end surface which is spaced from the concave spherical surface of said base so that said threaded bore extends from said concave spherical surface to said opposite end surface, and (c) spacing legs which extend from said opposite end surface to said flat supporting surface so that said opposite end surface is spaced form said flat supporting surface to define said access opening.

5. An optic positioning device as recited in claim 2, wherein said holding body has an internal chamber which contains the head portion of said bolt and said clamping surface.

6. An optic positioning device as recited in claim 2, wherein said supporting base comprises:
   (a) a mounting plate which has a flat supporting surface,
   (b) a main body portion which has an opposite end surface which is spaced from the concave spherical surface of said base so that said threaded bore extends from said concave spherical surface to said opposite end surface, and
   (c) spacing legs which extend form said opposite end surface to said flat supporting surface so that said opposite end surface is spaced from said flat supporting surface to define said access opening.

7. An optic positioning device for holding an optical element which has a center for moving said optical element relative to the central longitudinal axis of a beam of electromagnetic radiation, said optical mounting means comprising:
   (a) a supporting base which has an upwardly facing concave spherical surface,
   (b) a holding body for supporting said optical element said holding body having a downwardly facing convex spherical surface which rests on said concave spherical surface, the radial center of said concave and convex surfaces being at the center of said optical element, said supporting base having a central vertical axis which extends through the center of said optical element and through a midpoint of said concave surface, said holding body having a central longitudinal axis which extends through the center of said optical element and a midpoint of said convex spherical surface, said convex spherical surface being slidable on said concave spherical surface so that said holding body can rotate about said vertical axis and said holding body can pivot about the center of said optical element in all vertical planes from a position in which said central longitudinal axis is concentric with said vertical axis to a position in which said central longitudinal axis is at a predetermined angle to said vertical axis.

8. An optic positioning device as recited in claim 7, wherein said supporting base has an access opening below said concave surface and a threaded bore which is concentric with said vertical axis and which extends from said concave surface to said access opening, where said holding body has an upwardly facing clamping surface which is spaced from and above said convex surface and an aperture which extends from said clamping surface to said convex surface, and wherein said clamping means comprises:
   (a) a bolt which has a head portion for engaging said clamping surface and a threaded shank portion which extends from said head to said access opening and is threaded into said bore, and
   (b) a clamping actuator which is located at said access opening and which is fixed to said shank portion for rotating said shank portion about said vertical axis and causing said head portion to move toward said clamping surface when said shank portion is rotated in one direction and away from said clamping surface when shank portion is rotated in the opposite direction form said one direction.

9. An optic positioning device as recited in claim 8, wherein said clamping surface is a concave spherical surface which has a radial center at the center of said optical elements and wherein the head portion of said bolt has a convex surface which engages said clamping surface, the convex surface of said head portion having a radial center at the center of said optical element.

10. An optic positioning device as recited in claim 9, wherein said holding body has an internal chamber which contains the head portion of said bolt and said clamping surface.

11. An optic positioning device as recited in claim 9, wherein said supporting base comprises:
   (a) a mounting plate which has flat supporting surface,
   (b) a main body portion which has an opposite end surface which is spaced from the concave spherical surface of said base so that said threaded bore extends from said concave spherical surface to said opposite end surface, and
   (c) spacing legs which extend from said opposite end surface and said flat supporting surface so that said opposite end surface is spaced form said flat supporting surface to define said access opening.

12. An optic positioning device for holding an optical element which has a center for moving said optical element relative to the central longitudinal axis of a beam of electromagnetic radiation, said optical mounting means comprising:
   (a) a supporting base which has a top horizontal surface which has a central depression, said central depression being defined by an upwardly facing concave spherical surface,
   (b) a holding body for supporting said optical element, said holding body having a downwardly facing convex spherical surface which rests on said concave spherical surface, the radial center of said concave and convex surfaces being at the center of said optical element, said supporting base having a central vertical axis which extends through the center of said optical element and through a midpoint of said concave surface, said holding body having a central longitudinal axis which extends through the center of said optical element and a midpoint of said convex spherical surface, said convex spherical surface being slidable on said concave spherical surface so that said holding body can rotate about said vertical axis and said holding body can pivot about the center of said optical element in all vertical planes from a position in which said central longitudinal axis is concentric with said vertical axis to a position in which said central longitudinal axis is at a predetermined angle to said vertical axis.

* * * * *